(12) United States Patent
Du

(10) Patent No.: US 12,513,744 B2
(45) Date of Patent: Dec. 30, 2025

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Zhongda Du, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 402 days.

(21) Appl. No.: 18/088,535

(22) Filed: Dec. 24, 2022

(65) Prior Publication Data

US 2023/0209599 A1    Jun. 29, 2023

Related U.S. Application Data

(63) Continuation of application No. PCT/CN2020/129468, filed on Nov. 17, 2020.

(51) Int. Cl.
*H04W 74/0808* (2024.01)

(52) U.S. Cl.
CPC .................. *H04W 74/0808* (2013.01)

(58) Field of Classification Search
CPC .................................. H04W 74/0808
See application file for complete search history.

(56) References Cited

U.S. PATENT DOCUMENTS

| 12,219,655 | B2* | 2/2025 | Zhou | H04W 48/16 |
| 2021/0329633 | A1* | 10/2021 | Xing | H04W 72/0446 |
| 2022/0070825 | A1* | 3/2022 | Xue | H04W 72/21 |
| 2022/0256548 | A1* | 8/2022 | Park | H04W 4/40 |

FOREIGN PATENT DOCUMENTS

| CN | 107371168 A | 11/2017 |
| CN | 109863777 A | 6/2019 |
| CN | 110582119 A | 12/2019 |
| CN | 110636627 A | 12/2019 |
| CN | 111132365 A | 5/2020 |

(Continued)

OTHER PUBLICATIONS

Extended European Search Report dated Oct. 20, 2023 received in European Patent Application No. EP20961836.2.

(Continued)

*Primary Examiner* — James P Duffy
(74) *Attorney, Agent, or Firm* — Sheppard, Mullin, Richter & Hampton LLP

(57) ABSTRACT

Provided are a wireless communication method, a terminal device, and a network device. The method includes determining, by a terminal device based on a first timer and a first counter, whether a persistent listen before talk (LBT) failure event occurs on a first resource pool. The first resource pool is a resource pool associated with a first transmission resource. The first transmission resource is a transmission resource used by the terminal device for sidelink transmission. The first timer is a timer corresponding to the first resource pool. The first counter is configured to count the number of LBT failures occurring on the first resource pool during operation of the first timer.

20 Claims, 2 Drawing Sheets

(56) References Cited

FOREIGN PATENT DOCUMENTS

| EP | 3846573 A1 | 7/2021 |
|---|---|---|
| WO | 2018148034 A1 | 8/2018 |
| WO | 2020045920 A1 | 3/2020 |
| WO | 2020098691 A1 | 5/2020 |
| WO | 2020198584 A1 | 10/2020 |
| WO | 2020223692 A1 | 11/2020 |

OTHER PUBLICATIONS

Office Action issued by the European Patent Office for Application No. EP20961836.2 mailed on Dec. 18, 2024.
Office Action issued by the European Patent Office for Application No. EP20961836.2 mailed on Jun. 11, 2024.
International Search Report and Written Opinion dated Aug. 20, 2021 in International Application No. PCT/CN2020/129468. English translation attached.
5G;NR; "Medium Access Control (MAC) protocol specification", 3GPP TS 38.321 version 16.1.0(Release 16), Jul. 2020 (Jul. 2020).
"3rd Generation Partnership Project; Technical Specification Group Radio Access Network; NR; Radio Resource Control (RRC) protocol specification (Release 16)", 3GPP TS 38.331 V16.0.0, Mar. 2020.

* cited by examiner

WIRELESS COMMUNICATION METHOD, TERMINAL DEVICE AND NETWORK DEVICE

CROSS-REFERENCE TO RELATED APPLICATION

This application is a continuation of International Application No. PCT/CN2020/129468 filed on Nov. 17, 2020, which is hereby incorporated by reference in its entirety.

FIELD

Embodiments of the present disclosure relate to the field of communications, and more specifically, to a wireless communication method, a terminal device, and a network device.

BACKGROUND

In order to allow various communication systems that use an unlicensed frequency spectrum for wireless communication to coexist friendly on the unlicensed frequency spectrum, some countries or regions have stipulated legal requirements that must be met when using the unlicensed frequency spectrum. For example, the communication device follows the "Listen Before Talk (LBT)" principle. That is, the communication device needs to perform channel listening before transmitting signals on a channel of the unlicensed frequency band. The communication device can transmit signals only when a result of channel listening indicates that the channel is idle. When the result of channel listening by the communication device on the channel of the unlicensed frequency band indicates that the channel is busy, the communication device cannot transmit signals.

In uplink and downlink, a physical layer of a terminal device detects, on a basis of per carrier, whether a persistent LBT failure event occurs on a carrier. In sidelink, there is strong directivity for communication between the terminal devices. When the frequency band of the unlicensed frequency spectrum is relatively high, for example, 60 GHz, the directivity is embodied in the need for introduction of a directional LBT mechanism and beamforming when a wireless signal is transmitted. Therefore, how to perform persistent LBT monitoring of the sidelink is an urgent problem to be solved.

SUMMARY

Embodiments of the present disclosure provide a wireless communication method, a terminal device, and a network device.

In a first aspect, a wireless communication method is provided. The method includes: determining, by a terminal device based on a first timer and a first counter, whether a persistent listen before talk (LBT) failure event occurs on a first resource pool. The first resource pool is a resource pool associated with a first transmission resource. The first transmission resource is a transmission resource used by the terminal device for sidelink transmission. The first timer is a timer corresponding to the first resource pool. The first counter is configured to count the number of LBT failures occurring on the first resource pool during operation of the first timer.

In a second aspect, a wireless communication method is provided. The method includes: transmitting, by a network device, first configuration information to a terminal device. The first configuration information is configured to configure a timer and a counter corresponding to each resource pool configured on the terminal device. The counter corresponding to each resource pool is configured to count the number of listen before talk (LBT) failures occurring on each resource pool during operation of the timer corresponding to each resource pool.

In a third aspect, a terminal device is provided. The terminal device includes: a memory having a computer program stored thereon; and a processor configured to invoke and execute the computer program stored in the memory to perform the method in the first aspect or in each implementation thereof.

DETAILED DESCRIPTION

Figure 1:
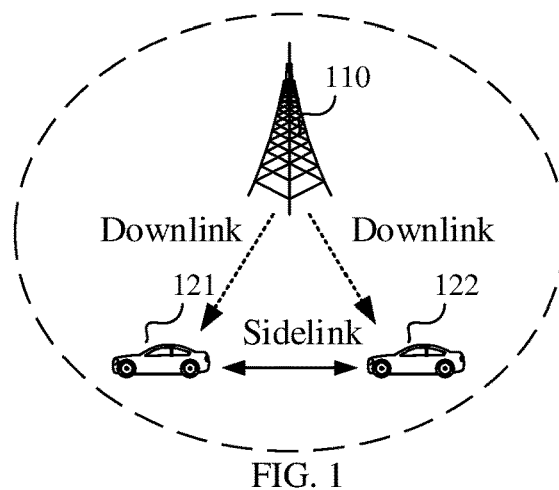
FIG. 1 is a schematic diagram showing a communication system architecture according to an embodiment of the present disclosure.

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. For the embodiments in the present disclosure, all other embodiments obtained by a person skilled in the art without creative labor shall fall within the protection scope of the present disclosure.

The embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Non-Terrestrial Networks (NTN) system, a Universal Mobile Telecommunication System (UMTS), a Wireless Local Area Network (WLAN), Wireless Fidelity (WiFi), a 5th-Generation (5G) communication system, or other communication systems, etc.

Generally speaking, conventional communication systems support a limited number of connections and are easy to implement. However, with the development of communication technologies, mobile communication systems will support not only conventional communication, but also, for example, Device to Device (D2D) communication, Machine to Machine (M2M) communication, Machine Type Communication (MTC), and Vehicle to Vehicle (V2V) communication, or Vehicle to everything (V2X) communication, etc. The embodiments of the present disclosure can also be applied to these communication systems.

Optionally, the communication system according to the embodiments of the present disclosure may be applied to a Carrier Aggregation (CA) scenario, a Dual Connectivity (DC) scenario, or a Standalone (SA) network deployment scenario.

Optionally, the communication system of the embodiments of the present disclosure may be applied to unlicensed spectrum. The unlicensed spectrum may also be considered as shared spectrum. Alternatively, the communication system of the embodiments of the present disclosure may be applied to licensed spectrum. The licensed spectrum may also be considered as non-shared spectrum.

The embodiments of the present disclosure are described in conjunction with a network device and a terminal device. Here, the terminal device may also be referred to as a User Equipment (UE), an access terminal, a user unit, a subscriber station, a mobile station, a mobile platform, a remote station, a remote terminal, a mobile device, a user terminal, a terminal, a wireless communication device, a user agent, a user apparatus, etc.

The terminal device may be a STATION (ST) in a WLAN, a cellular phone, a cordless phone, a Session Initiation Protocol (SIP) phone, a Wireless Local Loop (WLL) station, a Personal Digital Assistant (PDA) device, a handheld devices having a wireless communication function, a computing device or other processing devices connected to a wireless modem, a vehicle-mounted device, a wearable device, and a next-generation communication system, e.g., a terminal device in an NR network or a terminal device in a future-evolved Public Land Mobile Network (PLMN) network.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a Mobile Phone, a tablet computer (Pad), a computer with a wireless transceiver function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, etc.

By way of example but not limitation, in the embodiments of the present disclosure, the terminal device may be a wearable device. The wearable device can also be called a wearable smart device, which is a general term for devices that are wearable and developed by applying wearable technology to intelligently design daily wears, such as glasses, gloves, watches, clothing, shoes, etc. A wearable device is a portable device that is worn directly on the body or integrated into a user's clothing or accessory. The wearable device is not only a hardware device, but also realizes powerful functions through software support, data interaction, and cloud interaction. In a broad sense, wearable smart devices include a fully-functioned, large-size device that can achieve all or partial functions without relying on a smart phone, e.g., a smart watch or a pair of smart glasses, and a device that only focuses on a certain type of application function and needs to cooperate with other devices such as a smartphone, e.g., various types of smart bracelets and smart jewelry that monitor physical signs.

In the embodiments of the present disclosure, the network device may be a device configured to communicate with a mobile device. The network device may be an Access Point (AP) in a WLAN, a base station such as a Base Transceiver Station (BTS) in a GSM or a CDMA, a base station such as NodeB (NB) in a WCDMA, an evolutional base station such as an Evolutional Node B (eNB or eNodeB) in an LTE, a relay station or an access point, a vehicle-mounted device, a wearable device, a network device or a base station such as a gNB in an NR network, a network device in a future-evolved PLMN network, or a network device in an NTN.

By way of example but not limitation, in the embodiments of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device communicates with the network device through transmission resources (for example, frequency domain resources, or spectrum resources) used by the cell. The cell may be a cell corresponding to the network device (e.g., a base station), and the cell can belong to a macro base station, or a base station corresponding to a Small cell. Here, the small cell may include a Metro cell, a Micro cell, a Pico cell, a Femto cell, etc. These small cells have characteristics of small coverage and low transmit power, and are suitable for providing high-speed data transmission services.

It should be understood that terms "system" and "network" are often used interchangeably herein. The term "and/or" as used herein only represents a relationship between correlated objects, including three relationships. For example, "A and/or B" may mean A only, B only, or both A and B. In addition, the symbol "/" as used herein generally represents an "or" relationship between the correlated objects preceding and succeeding the symbol.

The terms used in the implementations of the present disclosure are only used for explaining the specific embodiments of the present disclosure, and are not intended to limit the present disclosure. The terms "first", "second", "third", "fourth" and the like in the specification and claims of the present disclosure and the accompanying drawings are used to distinguish different objects, rather than to describe a specific sequence. In addition, terms "including", "comprising" and "having" and any variations thereof indicate non-exclusive inclusions.

It should be understood that the term "indication" as used in the embodiments of the present disclosure may be a direct indication, an indirect indication, or may imply an association. For example, when A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or an association between the two, or that they are in a relation of indicating and indicated, configuring or configured, or the like.

In the embodiments of the present disclosure, "predefined" may be implemented by pre-storing corresponding codes, tables, or other possible manners for indicating related information in a device (for example, including a terminal device and a network device), and the present disclosure is not limited in specific implementations thereof. For example, being predefined may refer to being defined in the protocol.

In the embodiments of the present disclosure, "protocol" may refer to a standard protocol in the field of communications, and for example, may include an LTE protocol, an NR protocol, and a related protocol applied in a future communication system, which is not limited in the present disclosure.

FIG. 1 is a schematic diagram of a communication system to which an embodiment of the present disclosure is applicable. In the communication system, a vehicle-mounted terminal may perform uplink and downlink data transmission with a network device. Sidelink data transmission may be performed between the vehicle-mounted terminals (for example, a vehicle-mounted terminal 121 and a vehicle-mounted terminal 122) using a sidelink resource.

For sidelink transmission, two transmission modes are defined in the 3rd Generation Partnership Project (3GPP), which are respectively referred to as: a first transmission mode and a second transmission mode.

First transmission mode: a transmission resource of the terminal device is allocated by the base station. The terminal device transmits data on sidelink based on the resource allocated by the base station. The base station may allocate, to the terminal device, a resource for single transmission (that is also called a dynamically scheduled resource) or a resource for semi-persistent transmission, which is also called a scheduling-free resource or a pre-configured resource, for example, a Configured Grant (CG) and a scheduling-free grant.

Second transmission mode: the terminal device selects, from a resource pool, a resource for data transmission. The resource pool may be a pre-configured resource pool, or a network-device-configured resource pool. For example, the terminal device is located outside coverage of a cell. In this case, the terminal device autonomously selects, from the pre-configured resource pool, a transmission resource for sidelink transmission. Alternatively, the terminal device autonomously selects, from the network-configured resource pool, a transmission resource for sidelink transmission.

It should be noted that, in NR-V2X, the terminal device may be in a mixed mode, i.e., not only can the first transmission mode be used for resource obtaining, but the second transmission mode can also be used for resource obtaining.

An unlicensed frequency spectrum (that may also be referred to as a shared spectrum or a non-licensed spectrum) is a spectrum allocated by countries and regions for radio device communication. The spectrum is generally considered to be a shared spectrum. That is, communication devices in different communication systems can use the spectrum as long as they meet regulatory requirements set by a corresponding country or region on the spectrum, without applying for proprietary spectrum authorization from the government.

In order to allow various communication systems that use an unlicensed frequency spectrum for wireless communication to coexist friendly on the unlicensed frequency spectrum, some countries or regions have stipulated legal requirements that must be met when using the unlicensed frequency spectrum. For example, the communication device follows the "Listen Before Talk (LBT)" principle. That is, the communication device needs to perform channel listening before transmitting signals on a channel of the unlicensed frequency band. The communication device can transmit signals only when a result of channel listening indicates that the channel is idle. When the result of channel listening by the communication device on the channel of the unlicensed frequency band indicates that the channel is busy, the communication device cannot transmit signals.

In uplink and downlink, a physical layer of the terminal device detects, on a basis of per carrier, a persistent LBT failure event. In the sidelink, there is strong directivity for communication between the terminal devices. When the frequency band of the unlicensed frequency spectrum is relatively high, for example, 60 GHz, the directivity is embodied in the need for introduction of a directional LBT mechanism and beamforming when a wireless signal is transmitted. In addition, a plurality of resource pools may exist on a lateral link, and the plurality of resource pools on frequency domain may span different LBT bandwidths. Therefore, an LBT detection mechanism taking a carrier as granularity is not applicable to the sidelink.

In view of this, the embodiments of the present disclosure provide a technical solution that takes the resource pool as the granularity to configure a corresponding timer and counter and further determines whether a persistent LBT event occurs on the resource pool based on the timer and counter corresponding to the resource pool, which is beneficial to satisfying requirements for the sidelink.

Figure 2:
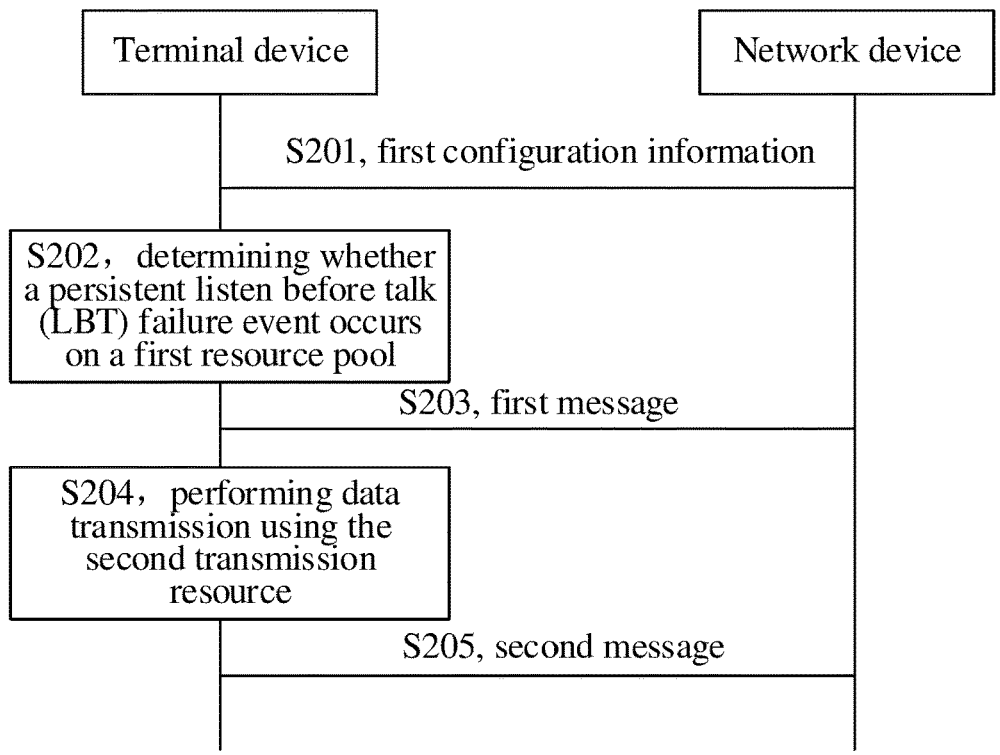
FIG. 2 is a schematic interaction diagram showing a wireless communication method according to an embodiment of the present disclosure.

FIG. 2 is a schematic interaction diagram showing a wireless communication method 200 according to an embodiment of the present disclosure. As illustrated in FIG. 2, the method 200 may at least include a part of the following content.

At S201, a terminal device determines whether a persistent listen before talk (LBT) failure event occurs on a first resource pool based on a first timer and a first counter. The first resource pool is a resource pool associated with a first transmission resource. The first transmission resource is a transmission resource used by the terminal device for sidelink transmission. The first timer is a timer corresponding to the first resource pool. The first counter is configured to count the number of LBT failures occurring on the first resource pool during operation of the first timer.

In the embodiments of the present disclosure, the terminal device may transmit or receive a sidelink signal using the first transmission resource. Optionally, the first transmission resource is a transmission resource currently selected by the terminal device for use in transmitting or receiving the sidelink signal. In some embodiments, the first transmission resource may be used for initial transmission or retransmission of sidelink data.

Optionally, the sidelink signal may refer to any sidelink physical channel or sidelink reference signal transmitted or received on the sidelink.

For example, the sidelink physical channel may include but is not limited to a Physical Sidelink Control Channel (PSCCH), a Physical Sidelink Shared Channel (PSSCH), and a Physical Sidelink Feedback Channel (PSFCH).

For example, the sidelink reference signal may include but is not limited to a Sidelink Synchronization Signal Block (S-SSB), a Sidelink Channel State Information Reference Signal (SL CSI-RS), a Demodulation Reference Signal (DMRS), etc. The S-SSB includes a Sidelink Primary Synchronization Signal (S-PSS) and a Sidelink Secondary Synchronization Signal (S-SSS). The DMRS includes DMRS for PSCCH, PSSCH, and PSBCH demodulation.

In the embodiments of the present disclosure, the first transmission resource being associated with the first resource pool may refer to the first resource pool including configuration information related to the data transmission using the first transmission resource, for example, transmission configuration or feedback configuration.

In the embodiments of the present disclosure, the first resource pool is configured with the corresponding timer and counter, which are respectively referred to as the first timer and the first counter. The first timer and the first counter are used for detecting whether the persistent LBT failure event occurs on the first resource pool. For example, it is determined, on a condition that a count value of the first counter is greater than or equal to a first threshold before the first timer expires, that the persistent LBT failure event occurs on the first resource pool.

Optionally, a starting condition of the first timer may be that the terminal device receives the first LBT failure indication for the first resource pool.

That is, when receiving the first indication information indicating that the LBT failure occurs on the first resource pool, the terminal device may start the first timer. When the number of receptions of indication information indicating that the LBT failure occurs on the first resource pool is greater than or equal to the first threshold before the first timer expires, it is determined that the persistent LBT failure event occurs on the first resource pool. Optionally, when the number of receptions of the indication information indicating that the LBT failure occurs on the first resource pool does not exceed the first threshold at the expiration of the first timer, it is determined that no persistent LBT failure event occurs on the first resource pool. Further, the first timer and the first counter may be reset.

Optionally, in some embodiments, each of all resource pools configured on the terminal device corresponds to a corresponding timer and counter and is configured to determine whether the persistent LBT failure event occurs on the corresponding resource pool.

Optionally, in some embodiments, the resource pool on the terminal device may be pre-configured or network-device-configured, and this embodiment is not limited thereto.

Optionally, in some embodiments, duration of the timer corresponding to the resource pool may be pre-configured, and a count threshold of the counter corresponding to the resource pool may also be pre-configured.

Optionally, in some other embodiments, the method 200 may include the following steps.

At S201, the network device transmits first configuration information to the terminal device. The first configuration information is configured to configure the duration of the timer corresponding to the resource pool and/or the count threshold of the counter corresponding to the resource pool (for example, the first threshold).

Optionally, the first configuration information may also be transmitted by any downlink message, for example, a Radio Resource Control (RRC) message, a Media Access Control Control Element (MAC CE), etc.

Optionally, durations of timers corresponding to resource pools configured on the terminal device may be the same or different. Similarly, count thresholds of counters corresponding to the resource pools configured on the terminal device may be the same or different, and this embodiment is not limited thereto.

Optionally, in some embodiments, whether the terminal device successfully executes LBT detection on the first resource pool may be performed by the physical layer of the terminal device. Determination of whether the persistent LBT failure event occurs on the first resource pool may be performed by a MAC layer of the terminal device. For example, after the physical layer of the terminal device fails to perform the LBT detection on the first resource pool, an LBT failure event may be reported to the MAC layer of the terminal device, and the MAC layer of the terminal device counts the event. When a count value reaches the first threshold, it is determined that the persistent LBT failure event occurs on the first resource pool.

Optionally, in some embodiments of the present disclosure, the MAC layer of the terminal device may transmit first indication information to a higher layer of the terminal device. The first indication information is configured to indicate that the persistent LBT failure event occurs on the first resource pool. Optionally, the higher layer of the terminal device includes a protocol layer above an RRC layer of the terminal device.

Optionally, in some embodiments of the present disclosure, the MAC layer of the terminal device may transmit second indication information to the higher layer of the terminal device. The second indication information is configured to indicate that the persistent LBT failure event occurs on each of all the resource pools configured on the terminal device.

Below are described subsequent processing manners of the terminal device when the persistent LBT event occurs on the first resource pool.

Manner 1

At block S203, the terminal device may transmit a first message to the network device when the persistent LBT failure event occurs on the first resource pool. The first message is configured to notify the network device that the persistent LBT failure event occurs on the first resource pool.

In a case where the persistent LBT failure event occurs on the resource pool, the event is reported to the network device, which facilitates the network device to adjust a scheduling policy of the terminal device so as to ensure subsequent data transmission.

In some scenarios, in a case where the terminal device needs to transmit the sidelink data, a transmission resource may be selected. The transmission resource may be allocated by the network device (corresponding to the first transmission mode) or selected by the terminal device from the pre-configured resource pool or the network-device-configured resource pool (corresponding to the second transmission mode).

For the first transmission mode, the resource allocated by the network device may be the dynamically scheduled resource or the scheduling-free transmission resource.

In some embodiments, the terminal device currently operates in the first transmission mode, i.e., the first transmission resource used by the terminal device for sidelink transmission is allocated by the network device. In this case, when the persistent LBT failure event occurs on the resource pool associated with the first transmission resource, the terminal device may report the persistent LBT failure event to the network device. In this way, the network device may adjust the scheduling policy of the terminal device, for example, to schedule sidelink transmission of the terminal device on a resource pool where no persistent LBT failure event occurs.

As an embodiment, when the terminal device operates in the first transmission mode and the first transmission resource is the dynamically scheduled resource, in this case, supposing that the persistent LBT failure event occurs on the resource pool associated with the first transmission resource, the terminal device may report the persistent LBT failure event to the network device.

In some other scenarios, the first transmission resource may be a transmission resource for transmitting sidelink feedback information. The first resource pool may be a receiving resource pool.

In this case, when the persistent LBT failure event occurs on the first resource pool, the terminal device may report the persistent LBT failure event to the network device. In this way, the network device may timely determine that the terminal device cannot perform sidelink feedback, and further take corresponding measures, such as reconfiguring a new resource pool for the sidelink feedback (for example, configuring the resource pool on which no persistent LBT failure event occurs), or re-transmitting downlink data that needs to be fed back on sidelink, etc.

Figure 3:
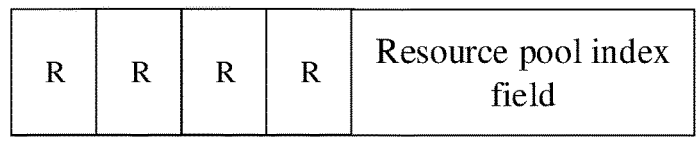
FIG. 3 is a schematic diagram showing a MAC CE format for reporting a resource pool index where a persistent LBT failure event occurs.

Optionally, in some embodiments, the first message includes an index number of the first resource pool on which the persistent LBT failure event occurs. For example, as illustrated in FIG. 3, the first message may include a resource pool index field. The resource pool index field is configured to carry an index number of the resource pool on which the persistent LBT failure event occurs.

Optionally, a length of the resource pool index field may be determined by a maximum number of resource pools configured by the network device. For example, the network device may configure sixteen resource pools at most, and the resource pool index field may be 4 bits.

In some embodiments, the first message may be any of existing downlink messages, for example, but not limited to, the RRC message and the MAC CE. As a specific example, the first message is a SidelinkUEinformationNR message.

In some other embodiments, the first message may also be a newly added message, for example, may be a newly added RRC message, a newly added MAC CE, etc., for reporting that the persistent LBT failure event occurs on the resource pool.

As an example, the first message is the MAC CE, then the MAC CE corresponds to a first logical channel identifier (LCID), and the first LCID indicates that the MAC CE is configured to report that the persistent LBT failure event occurs on the resource pool.

Optionally, in some embodiments, the first message may also include an index number of a carrier corresponding to the first resource pool, which is configured to indicate a carrier corresponding to the resource pool on which the persistent LBT failure event occurs.

Manner 2

At block S204, the terminal device performs the sidelink transmission using a second transmission resource when the persistent LBT failure event occurs on the first resource pool. The second transmission resource is associated with a second resource pool, and no persistent LBT failure event occurs on the second resource pool.

That is, in a case where the persistent LBT failure event occurs on a resource pool associated with the transmission resource on which the sidelink transmission is currently performed, the terminal device may switch to the resource pool on which no persistent LBT failure event occurs for sidelink transmission. For example, retransmission of a non-transmitted Transport Block (TB), or initial transmission and retransmission of a new TB, etc. are performed.

In some embodiments, the terminal device currently operates in the first transmission mode, and the first transmission resource is the scheduling-free resource. In this case, when the persistent LBT failure event occurs on the resource pool associated with the first transmission resource, the terminal device may change to another resource pool on which no persistent LBT failure event occurs (if the terminal device is configured with the plurality of resource pools) for sidelink transmission.

In some other embodiments, the terminal device currently operates in the second transmission mode. In this case, when the persistent LBT failure event occurs on the resource pool associated with the first transmission resource, the terminal device may reselect one resource pool on which no persistent LBT failure event occurs (if the plurality of resource pools is configured on the terminal device), and one transmission resource is selected from the resource pool for sidelink transmission.

Further, optionally, when the persistent LBT failure event occurs on each of all the resource pools configured on the terminal device, the method 200 further includes the following steps.

At S205, the terminal device transmits the second message to the network device. The second message is configured to notify the network device that the persistent LBT failure event occurs on each of all resource pools configured on the terminal device. In this way, the network device may configure a new resource pool for the terminal device for subsequent sidelink transmission.

Optionally, in some embodiments, the second message includes an index number of each of all resource pools where the persistent LBT failure event occurs. The second message may include the resource pool index field. The resource pool index field is configured to carry the index number of each of all the resource pools where the persistent LBT failure event occurs.

Optionally, in some other embodiments, the second message includes a first indication bit. Different values of the first indication bit are configured to indicate whether the persistent LBT failure event occurs on each of all the resource pools.

Figure 4:
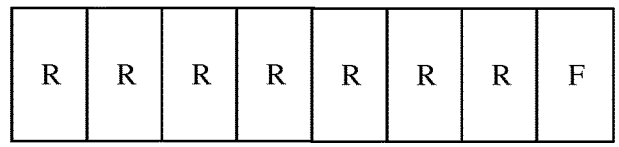
FIG. 4 is a schematic diagram showing a MAC CE format for reporting that a persistent LBT failure event occurs on each of all resource pools.

Optionally, as illustrated in FIG. 4, the first indication bit may be 1 bit (F bit). Different values of the 1 bit are configured to indicate whether the persistent LBT failure event occurs on each of all the resource pools configured on the terminal device. For example, a value of 0 indicates that the persistent LBT failure event occurs on each of all the resource pools, and a value of 1 indicates that the persistent LBT failure event does not occur on each of all the resource pools.

In some embodiments, the second message may be any of existing downlink messages, for example, but not limited to, the RRC message and the MAC CE. As a specific example, the second message is the SidelinkUEinformationNR message.

In some other embodiments, the second message may also be the newly added message, for example, may be the newly added RRC message, the newly added MAC CE, etc., for reporting that the persistent LBT failure event occurs on the resource pool.

As an example, the second message is the MAC CE, and the MAC CE corresponds to a second LCID. The second LCID indicates that the MAC CE is configured to report that the persistent LBT failure event occurs on each of all the resource pools.

Below are described, in combination with specific examples, the subsequent processing manners of the terminal device when the persistent LBT event occurs on the first resource pool.

Embodiment 1: the terminal device operates in the first transmission mode, and the resource used by the terminal device for sidelink transmission is the dynamically scheduled resource of the network device.

That is, the terminal device is not configured with scheduling-free grant. Initial transmission and retransmission of each TB by the terminal device are transmitted by using the dynamically scheduled resource. The network device may indicate information of a resource pool associated with a transmission resource scheduled by the network device on a Physical Downlink Control Channel (PDCCH) for scheduling a lateral transmission resource.

Assuming that the network device configures four resource pools for the terminal device, corresponding index numbers are 0, 1, 2, and 3, respectively. The network device schedules the terminal device to transmit the data on the resource pool 2 based on features of service to be transmitted and configuration parameters of the resource pool. When the persistent LBT failure event occurs on the resource pool 2, the terminal device may transmit the first message to the network device and report a resource pool index 2 where the persistent LBT failure occurs to the network device.

As an example, the second message is a MAC CE format in FIG. 3, and the index number of the resource pool is 0010.

Embodiment 2: the terminal device operates in the first transmission mode, and the resource used by the terminal device for sidelink transmission is the scheduling-free resource.

For example, the terminal device is configured with two scheduling-free grants. Each cycle of scheduling-free grant 1 is configured with three radio resource blocks, and an associated resource pool index is 1. Each cycle of scheduling-free grant 2 is configured with three radio resource blocks, and an associated resource pool index is 2.

When the terminal device first selects the scheduling-free grant 1 for data transmission, and in a case where the data is not transmitted, the persistent LBT failure event occurs on the resource pool 1. In this case, the terminal device may reselect a resource in the resource pool 2 where no persistent LBT failure occurs, for example, the scheduling-free grant 2 for data transmission.

Further, when the persistent LBT failure event also occurs on the resource pool 2, the terminal device may transmit the second message to the network device for reporting that the persistent LBT failure event occurs on each of all the resource pools to the network device.

As an example, the second message is a MAC CE format in FIG. 4, and a value of an F bit in the MAC CE is 0.

Embodiment 3: the terminal device operates in the first transmission mode, the resource used by the terminal device for sidelink transmission is the scheduling-free resource, and the network device schedules the terminal device to retransmit the data by using the dynamically scheduled resource.

For example, the terminal device is configured with two scheduling-free grants. Each cycle of the scheduling-free grant 1 is configured with three radio resource blocks, and the associated resource pool index is 1. Each cycle of the scheduling-free grant 2 is configured with three radio resource blocks, and the associated resource pool index is 2.

When the terminal device first selects the scheduling-free grant 1 for data transmission, and in a case where the data has been transmitted but is not successfully transmitted, the network device schedules the terminal device again to retransmit the data by using the dynamically scheduled resource, the resource is associated with the resource pool 1, and the persistent LBT failure event occurs on the resource pool 1. In this case, the terminal device may transmit the first message to the network device and report the resource pool index 1 where the persistent LBT failure event occurs to the network device.

As an example, the second message is the MAC CE format in FIG. 3, and the index number of the resource pool is 0001.

Embodiment 4: the terminal device operates in the second transmission mode.

For example, the terminal device is configured with four resource pools, and the corresponding index numbers are 0, 1, 2, and 3, respectively.

The terminal device first selects a transmission resource in the resource pool 2 for sidelink transmission. When it is determined that the persistent LBT failure event occurs on the resource pool 2, the terminal device performs resource pool reselection. In particular, the terminal device chooses to re-determine a sidelink transmission resource from the resource pool on which no persistent LBT failure occurs, such as the resource pool 3.

Further, when the persistent LBT failure event occurs on each of all the resource pools configured on the terminal device, the terminal device transmits the second message to the network device. Optionally, the second message may include only one bit. For example, as illustrated in FIG. 4, the F bit in the MAC CE is set to 0, indicating that the persistent LBT failure event occurs on each of all the resource pools configured on the terminal device.

Embodiment 5: the terminal device is a terminal device that needs to transmit the sidelink feedback information, and the first transmission resource is a resource for transmitting the sidelink feedback information. In this case, the terminal device may be referred to as a receiving UE (RX UE), and the resource pool associated with the first transmission resource is an RX resource pool.

When a Hybrid Automatic Repeat reQuest (HARQ) feedback function has been started on the sidelink (i.e., it is required that the terminal device performs a HARQ feedback), the terminal device needs to transmit HARQ feedback information on the PSFCH. When the terminal device determines that the persistent LBT failure event occurs on the resource pool associated with the first transmission resource, the terminal device may transmit the first message to the network device for reporting an RX resource pool index where the persistent LBT failure event occurs to the network device.

Therefore, in the embodiments of the present disclosure, the configuration for the timer and the counter is performed by taking the resource pool as the granularity. In this way, the terminal device may perform the detection of the persistent LBT failure event by taking the resource pool as the granularity, which is applicable to the sidelink transmission mechanism. Further, in the case where the persistent LBT failure event occurs on the resource pool, the terminal device may report the persistent LBT failure event to the network device, so that the network device may adjust the scheduling policy in time, or may also switch to some other resource pools where no persistent LBT failure event occurs for data transmission, which is beneficial to ensuring timely and reliable transmission of the sidelink data.

Method embodiments of the present disclosure are described in detail above with reference to FIG. 2 to FIG. 4. Apparatus embodiments of the present disclosure will be described in detail below with reference to FIG. 5 to FIG. 7. It should be understood that the apparatus embodiments may correspond to the method embodiments, and reference may be made to the method embodiments for similar description of the apparatus embodiments.

Figure 5:
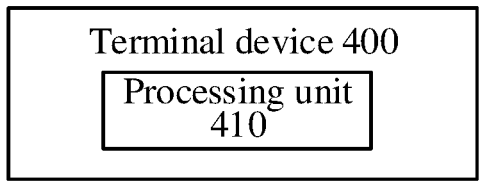
FIG. 5 is a schematic block diagram showing a terminal device according to an embodiment of the present disclosure.

FIG. 5 is a schematic block diagram showing a terminal device 400 according to an embodiment of the present disclosure. As illustrated in FIG. 5, the terminal 400 includes: a processing unit 410 configured to determine, based on a first timer and a first counter, whether a persistent listen before talk (LBT) failure event occurs on a first resource pool. The first resource pool is a resource pool associated with a first transmission resource. The first transmission resource is a transmission resource used by the terminal device for sidelink transmission. The first timer is a timer corresponding to the first resource pool. The first counter is configured to count the number of LBT failures occurring on the first resource pool during operation of the first timer.

Optionally, in some embodiments, the processing unit 410 is specifically configured to: determine, on a condition that a count value of the first counter is greater than or equal to a first threshold before the first timer expires, that the persistent LBT failure event occurs on the first resource pool.

Optionally, in some embodiments, the terminal device 400 further includes: a communication unit configured to transmit a first message to a network device when the persistent LBT failure event occurs on the first resource pool. The first message is configured to report that the persistent LBT failure event occurs on the first resource pool.

Optionally, in some embodiments, the communication unit is specifically configured to: transmit the first message to the network device when the terminal device operates in a first transmission mode and the persistent LBT failure event occurs on the first resource pool. In the first transmission mode, the first transmission resource is allocated by the network device.

Optionally, in some embodiments, the communication unit is specifically configured to: transmit the first message to the network device, when the terminal device operates in the first transmission mode, the first transmission resource is a dynamically scheduled transmission resource, and the persistent LBT failure event occurs on the first resource pool.

Optionally, in some embodiments, the communication unit is specifically configured to: transmit the first message to the network device when the first resource pool is a receiving resource pool and the persistent LBT failure event occurs on the first resource pool.

Optionally, in some embodiments, the first message includes an index number of the first resource pool on which the persistent LBT failure event occurs.

Optionally, in some embodiments, the first message is at least one of: a radio resource control (RRC) message and a media access control (MAC) control element (CE).

Optionally, in some embodiments, the RRC message is a SidelinkUEInformationNR message.

Optionally, in some embodiments, the first message is the MAC CE. The MAC CE corresponds to a first logical channel identifier (LCID). The first LCID indicates that the MAC CE is configured to report that the persistent LBT failure event occurs on the resource pool.

Optionally, the first message further includes an index number of a carrier corresponding to the first resource pool.

Optionally, in some embodiments, the terminal device 400 further includes: a communication unit configured to perform the sidelink transmission using a second transmission resource, when the persistent LBT failure event occurs on the first resource pool. The second transmission resource is associated with a second resource pool, and no persistent LBT failure event occurs on the second resource pool.

Optionally, in some embodiments, the communication unit is specifically configured to: perform the sidelink transmission using the second transmission resource, when the terminal device operates in a first transmission mode, the first transmission resource is a pre-configured resource, and the persistent LBT failure event occurs on the first resource pool. In the first transmission mode, the first transmission resource is allocated by the network device. Or the communication unit is specifically configured to: perform the sidelink transmission using the second transmission resource, when the terminal device operates in a second transmission mode and the persistent LBT failure event occurs on the first resource pool. The second transmission resource is selected by the terminal device in the second transmission mode.

Optionally, in some embodiments, the terminal device 400 further includes: the communication unit configured to, when a persistent LBT failure event occurs on each of all resource pools configured on the terminal device, transmit a second message to the network device. The second message is configured to report that the persistent LBT failure event occurs on each of all the resource pools.

Optionally, in some embodiments, the second message includes a first indication bit, different values of the first indication bit being configured to indicate whether the persistent LBT failure event occurs on each of all the resource pools; or the second message includes an index number of each of all resource pools where the persistent LBT failure event occurs.

Optionally, in some embodiments, the second message is one of: an RRC message and a MAC CE.

Optionally, in some embodiments, the RRC message is a SidelinkUEInformationNR message.

Optionally, in some embodiments, the second message is the MAC CE. The MAC CE corresponds to a second LCID. The second LCID indicates that the MAC CE is configured to report that the persistent LBT failure event occurs on each of all the resource pools.

Optionally, in some embodiments, the processing unit 410 is further configured to: transmit first indication information from a MAC layer to a higher layer. The first indication information is configured to indicate that the persistent LBT failure event occurs on the first resource pool.

Optionally, in some embodiments, the higher layer includes a protocol layer above an RRC layer of the terminal device.

Optionally, in some embodiments, the communication unit may be a communication interface or a transceiver, or an input/output interface of a communication chip or a system-on-chip. The processing unit may be one or more processors.

It should be understood that the terminal device 400 according to the embodiments of the present disclosure may correspond to the terminal device in the method embodiments of the present disclosure. In addition, the above and other operations and/or functions of each unit in the terminal device 400 are respectively intended to implement corresponding processes of the terminal device in the method 200 illustrated in FIG. 2 to FIG. 4. For brevity, details thereof will be omitted herein.

Figure 6:
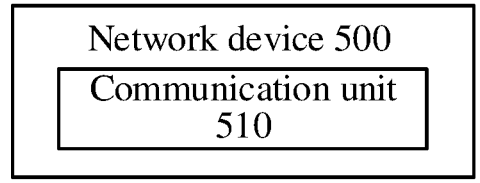
FIG. 6 is a schematic block diagram showing a network device according to an embodiment of the present disclosure.

FIG. 6 is a schematic block diagram showing a network device according to an embodiment of the present disclosure. The network device 500 of FIG. 6 includes: a communication unit 510 configured to transmit first configuration information to a terminal device. The first configuration information is configured to configure a timer and a counter corresponding to each resource pool configured on the terminal device. The counter corresponding to each resource pool is configured to count the number of listen before talk (LBT) failures occurring on each resource pool during operation of the timer corresponding to each resource pool.

Optionally, in some embodiments, the communication unit 510 is further configured to: receive a first message transmitted by the terminal device. The first message is configured to notify the network device that a persistent LBT failure event occurs on a first resource pool. The first resource pool is a resource pool associated with a first transmission resource. The first transmission resource is a transmission resource used by the terminal device for sidelink transmission.

Optionally, in some embodiments, the first message includes an index number of the first resource pool on which the persistent LBT failure event occurs.

Optionally, in some embodiments, the first message is at least one of: a radio resource control (RRC) message and a media access control (MAC) control element (CE).

Optionally, in some embodiments, the RRC message is a SidelinkUEInformationNR message.

Optionally, in some embodiments, the first message is the MAC CE. The MAC CE corresponds to a first logical channel identifier (LCID). The first LCID indicates that the MAC CE is configured to report that the persistent LBT failure event occurs on the resource pool.

Optionally, in some embodiments, the first message further includes an index number of a carrier corresponding to the first resource pool.

Optionally, in some embodiments, the network device 500 further includes: a processing unit configured to schedule the terminal device to transmit data in a resource pool on which no persistent LBT failure event occurs.

Optionally, in some embodiments, the communication unit is further configured to: receive a second message transmitted by the terminal device. The second message is configured to notify the network device that a persistent LBT failure event occurs on each of all resource pools configured on the terminal device.

Optionally, in some embodiments, the second message includes a first indication bit, different values of the first indication bit being configured to indicate whether the persistent LBT failure event occurs on each of all the resource pools; or the second message includes an index number of each of all resource pools where the persistent LBT failure event occurs.

Optionally, in some embodiments, the second message is one of: an RRC message and a MAC CE.

Optionally, in some embodiments, the RRC message is a SidelinkUEInformationNR message.

Optionally, in some embodiments, the second message is the MAC CE. The MAC CE corresponds to a second LCID. The second LCID indicates that the MAC CE is configured to report that the persistent LBT failure event occurs on each of all the resource pools.

Optionally, in some embodiments, the communication unit 510 is further configured to: transmit second configuration information to the terminal device. The second configuration information is configured to configure, for the terminal device, at least one resource pool on which no persistent LBT failure event occurs.

Optionally, in some embodiments, the communication unit may be a communication interface or a transceiver, or an input/output interface of a communication chip or a system-on-chip. The processing unit may be one or more processors.

It should be understood that the network device 500 according to the embodiments of the present disclosure may correspond to the network device in the method embodiments of the present disclosure. In addition, the above and other operations and/or functions of each unit in the network device 500 are respectively intended to implement corresponding processes of the network device in the method 200 illustrated in FIG. 2 to FIG. 4. For brevity, details thereof will be omitted herein.

Figure 7:
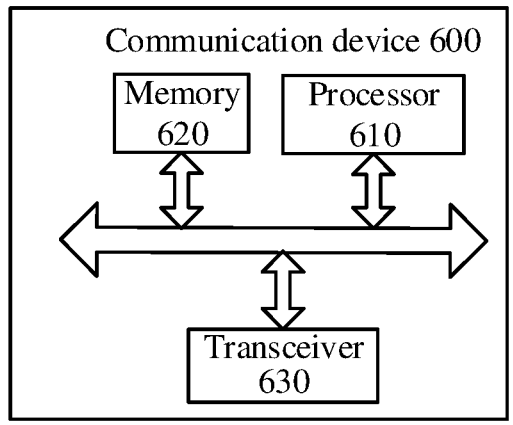
FIG. 7 is a schematic block diagram showing a communication device according to an embodiment of the present disclosure.

FIG. 7 is a schematic block diagram showing a communication device 600 according to an embodiment of the present disclosure. The communication device 600 illustrated in FIG. 7 includes a processor 610. The processor 610 may invoke and execute a computer program from a memory to perform the method according to an embodiment of the present disclosure.

Optionally, as illustrated in FIG. 7, the communication device 600 may further include a memory 620. The processor 610 may invoke and execute a computer program from the memory 620 to perform the method according to an embodiment of the present disclosure.

Here, the memory 620 may be a separate component independent of the processor 610, or may be integrated in the processor 610.

Optionally, as illustrated in FIG. 7, the communication device 600 may further include a transceiver 630. The processor 610 may control the transceiver 630 to communicate with other devices. Specifically, information or data may be transmitted to other devices, or information or data transmitted by other devices may be received.

Here, the transceiver 630 may include a transmitter and a receiver. The transceiver 630 may further include one or more antennas.

Optionally, the communication device 600 may specifically be a network device according to an embodiment of the present disclosure. The communication device 600 may execute corresponding processes implemented by the network device in a method according to an embodiment of the present disclosure. For brevity, repeated description is omitted herein.

Optionally, the communication device 600 may specifically be the mobile terminal/terminal device according to an embodiment of the present disclosure. The communication device 600 may execute corresponding processes implemented by the mobile terminal/terminal device in a method according to an embodiment of the present disclosure. For brevity, repeated description is omitted herein.

Figure 8:
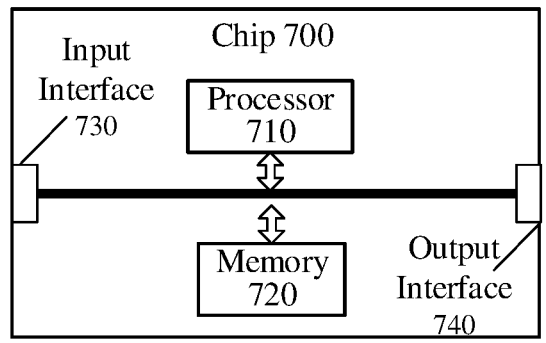
FIG. 8 is a schematic block diagram showing a chip according to an embodiment of the present disclosure.

FIG. 8 is a schematic diagram showing a structure of a chip according to an embodiment of the present disclosure. A chip 700 illustrated in FIG. 8 includes a processor 710. The processor 710 can invoke and execute a computer program from the memory to perform the method according to an embodiment of the present disclosure.

Optionally, as illustrated in FIG. 8, the chip 700 may further include a memory 720. The processor 710 may invoke and execute a computer program from the memory 720 to perform the method according to an embodiment of the present disclosure.

Here, the memory 720 may be a separate component independent of the processor 710, or may be integrated in the processor 710.

Optionally, the chip 700 may further include an input interface 730. The processor 710 can control the input interface 730 to communicate with other devices or chips. Specifically, information or data transmitted by other devices or chips can be obtained.

Optionally, the chip 700 may further include an output interface 740. The processor 710 can control the output interface 740 to communicate with other devices or chips. Specifically, information or data may be transmitted to other devices or chips.

Optionally, the chip can be applied to the network device according to an embodiment of the present disclosure. In addition, the chip can execute corresponding processes implemented by the network device in a method according to an embodiment of the present disclosure. For brevity, repeated description is omitted herein.

Optionally, the chip can be applied to the mobile terminal/terminal device according to an embodiment of the present disclosure. The chip can execute corresponding processes implemented by the mobile terminal/terminal device in a method according to an embodiment of the present disclosure. For brevity, repeated description is omitted herein.

It should be understood that the chip mentioned in the embodiments of the present disclosure may also be referred to as a system-level chip, a system-chip, a chip system, or a system-on-chip.

Figure 9:
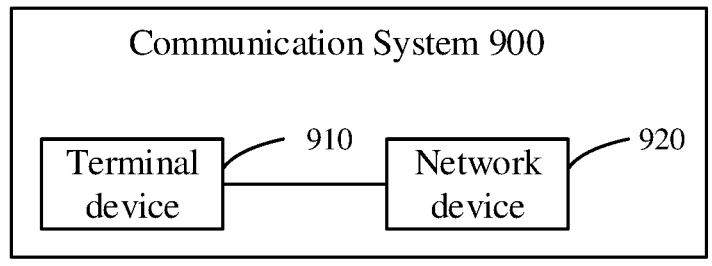
FIG. 9 is a schematic block diagram showing a communication system according to an embodiment of the present disclosure.

FIG. 9 is a schematic block diagram showing a communication system 900 according to an embodiment of the present disclosure. As illustrated in FIG. 9, the communication system 900 includes a terminal device 910 and a network device 920. The terminal device 910 can be configured to implement the corresponding functions implemented by the terminal device in the above method. The network device 920 can be configured to implement corresponding functions implemented by the network device in the above method. For brevity, repeated description is omitted herein.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The above processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or the processor and may be any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as a Random Access Memory (RAM), a flash memory, a Read-Only Memory (ROM), a Programmable ROM, an electrically erasable programmable memory, or a register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be an ROM, a Programmable ROM (PROM), an Erasable PROM (EPROM), an Electrically EPROM (EEPROM), or a flash memory. The transitory memory may be an RAM, which is used as an external cache. As illustrative, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

Optionally, the computer-readable storage medium can be applied to the network device in the embodiment of the present disclosure, and the computer program can cause a computer to perform corresponding procedures implemented by the network device in the method according to any of the embodiments of the present disclosure. For brevity, description thereof is omitted herein.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. For brevity, description thereof is omitted herein.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. For brevity, details thereof will be omitted here.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. For brevity, details thereof will be omitted here.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in each method according to the embodiments of the present disclosure. For brevity, details thereof will be omitted here.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. For brevity, details thereof will be omitted here.

It can be appreciated by those skilled in the art that units and algorithm steps in the examples described in connection to the embodiments disclosed herein can be implemented in an electronic hardware or any combination of a computer software and an electronic hardware. Whether these functions are executed by a hardware or a software depends on specific applications and design constraint conditions of the technical solutions. Those skilled in the art may use different methods for each specific application to implement the described functions, and such implementation is to be encompassed by the scope of the present disclosure.

Those skilled in the art can clearly understand that, for the convenience and conciseness of the description, for the specific operation processes of the systems, apparatuses, and units described above, reference can be made to the corresponding processes in the above method embodiments, and details thereof will be omitted here.

In the embodiments of the present disclosure, it can be appreciated that the disclosed systems, apparatuses, and methods may be implemented in other ways. For example, the apparatus embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between apparatuses or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, an ROM, an RAM, a magnetic disk, or an optical disc.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A wireless communication method, comprising:
determining, by a terminal device based on a first timer and a first counter, whether a persistent listen before talk (LBT) failure event occurs on a first resource pool, wherein the first resource pool is a resource pool associated with a first transmission resource, the first transmission resource being a transmission resource used by the terminal device for sidelink transmission and the first resource pool being a resource pool configured for the sidelink transmission, the first timer is a timer corresponding to the first resource pool, the first counter is configured to count a number of LBT failures occurring on the first resource pool during operation of the first timer, and the first timer and the first counter are configured by taking a resource pool as granularity.

2. The method according to claim 1, wherein said determining, by the terminal device based on the first timer and the first counter, whether the persistent LBT failure event occurs on the first resource pool comprises:
determining, on a condition that a count value of the first counter is greater than or equal to a first threshold before the first timer expires, that the persistent LBT failure event occurs on the first resource pool.

3. The method according to claim 1, further comprising:
transmitting, by the terminal device, a first message to a network device, when the persistent LBT failure event occurs on the first resource pool, wherein the first message is configured to report that the persistent LBT failure event occurs on the first resource pool.

4. The method according to claim 3, wherein said transmitting, by the terminal device, the first message to the network device when the persistent LBT failure event occurs on the first resource pool comprises:
transmitting, by the terminal device, the first message to the network device, when the terminal device operates in a first transmission mode and the persistent LBT failure event occurs on the first resource pool, wherein in the first transmission mode the first transmission resource is allocated by the network device; or
transmitting, by the terminal device, the first message to the network device, when the terminal device operates in the first transmission mode, the first transmission resource is a dynamically scheduled transmission resource, and the persistent LBT failure event occurs on the first resource pool.

5. The method according to claim 3, wherein the first message comprises an index number of the first resource pool on which the persistent LBT failure event occurs.

6. The method according to claim 3, wherein the first message is a media access control (MAC) control element (CE), the MAC CE corresponding to a first logical channel identifier (LCID), and the first LCID indicating that the MAC CE is configured to report that the persistent LBT failure event occurs on the resource pool.

7. The method according to claim 6, wherein the first message further comprises an index number of a carrier corresponding to the first resource pool.

8. The method according to claim 3, wherein said transmitting, by the terminal device, the first message to the network device, when the persistent LBT failure event occurs on the first resource pool comprises:
transmitting, by the terminal device, the first message to the network device, when the first resource pool is a receiving resource pool and the persistent LBT failure event occurs on the first resource pool.

9. The method according to claim 1, further comprising:
performing, by the terminal device, the sidelink transmission using a second transmission resource, when the persistent LBT failure event occurs on the first resource pool, wherein the second transmission resource is associated with a second resource pool, and no persistent LBT failure event occurs on the second resource pool.

10. The method according to claim 9, wherein said performing, by the terminal device, the sidelink transmission using the second transmission resource when the persistent LBT failure event occurs on the first resource pool comprises:
performing, by the terminal device, the sidelink transmission using the second transmission resource, when the terminal device operates in a first transmission mode, the first transmission resource is a pre-configured resource, and the persistent LBT failure event occurs on the first resource pool, wherein the first transmission resource is allocated by the network device in the first transmission mode; or
performing, by the terminal device, the sidelink transmission using the second transmission resource, when the terminal device operates in a second transmission mode and the persistent LBT failure event occurs on the first resource pool, wherein the second transmission resource is selected by the terminal device in the second transmission mode.

11. The method according to claim 9, further comprising:
when a persistent LBT failure event occurs on each of all resource pools configured on the terminal device, transmitting a second message to the network device, the second message being configured to report that the persistent LBT failure event occurs on each of all the resource pools.

12. The method according to claim 11, wherein:
the second message comprises a first indication bit, different values of the first indication bit being configured to indicate whether the persistent LBT failure event occurs on each of all the resource pools; or
the second message comprises an index number of each of all resource pools where the persistent LBT failure event occurs.

13. The method according to claim 11, wherein the second message is one of:
an RRC message and a MAC CE, wherein the second message is the MAC CE, the MAC CE corresponding to a second LCID, and the second LCID indicating that the MAC CE is configured to report that the persistent LBT failure event occurs on each of all the resource pools.

14. The method according to claim 1, further comprising:
transmitting, by a MAC layer of the terminal device, first indication information to a higher layer of the terminal device, the first indication information being configured to indicate that the persistent LBT failure event occurs on the first resource pool, wherein the higher layer of the terminal device comprises a protocol layer above an RRC layer of the terminal device.

15. A network device, comprising a processor and a memory, wherein the memory has a computer program stored thereon, and the processor is configured to invoke and execute the computer program stored in the memory, to cause the network device to perform:
transmitting first configuration information to a terminal device, the first configuration information being configured to configure a first timer and a first counter corresponding to a first resource pool configured on the terminal device, wherein the first counter is configured to count a number of listen before talk (LBT) failures occurring on the first resource pool during operation of the first timer the first timer and the first counter are configured for the terminal device to determine whether a persistent LBT failure event occurs on the first resource pool, the first resource pool being a resource pool configured for the sidelink transmission, and the first timer and the first counter are configured by taking a resource pool as granularity.

16. A terminal device, comprising a processor and a memory, wherein the memory has a computer program stored thereon, and the processor is configured to invoke and execute the computer program stored in the memory, to cause the terminal device to perform:
determining, based on a first timer and a first counter, whether a persistent listen before talk (LBT) failure event occurs on a first resource pool, wherein the first resource pool is a resource pool associated with a first transmission resource, the first transmission resource being a transmission resource used by the terminal device for sidelink transmission and the first resource pool being a resource pool configured for the sidelink transmission, the first timer is a timer corresponding to the first resource pool, the first counter is configured to count a number of LBT failures occurring on the first resource pool during operation of the first timer, and the first timer and the first counter are configured by taking a resource pool as granularity.

17. The terminal device according to claim 16, wherein the processor is configured to invoke and execute the computer program stored in the memory, to cause the terminal device further to perform:
determining, on a condition that a count value of the first counter is greater than or equal to a first threshold before the first timer expires, that the persistent LBT failure event occurs on the first resource pool.

18. The terminal device according to claim 16, wherein the processor is configured to invoke and execute the computer program stored in the memory, to cause the terminal device further to perform:
transmitting a first message to a network device when the persistent LBT failure event occurs on the first resource pool, wherein the first message is configured to report that the persistent LBT failure event occurs on the first resource pool.

19. The terminal device according to claim 18, wherein the first message is a media access control (MAC) control element (CE), the MAC CE corresponding to a first logical channel identifier (LCID), and the first LCID indicating that the MAC CE is configured to report that the persistent LBT failure event occurs on the resource pool.

20. The terminal device according to claim 16, wherein the processor is configured to invoke and execute the computer program stored in the memory, to cause a MAC layer of the terminal device further to perform:
   transmitting first indication information from a MAC layer to a higher layer, the first indication information being configured to indicate that the persistent LBT failure event occurs on the first resource pool.

* * * * *